(12) United States Patent
Riondato

(10) Patent No.: US 7,699,391 B2
(45) Date of Patent: Apr. 20, 2010

(54) BICYCLE SADDLE

(75) Inventor: Francesco Riondato, Via S. Matteo, 14, Bassano Del Grappa (IT) I-36061

(73) Assignee: Francesco Riondato, Bassano Del Grappa (Vicenza) (IT)

( * ) Notice: Subject to any disclaimer, the term of this patent is extended or adjusted under 35 U.S.C. 154(b) by 224 days.

(21) Appl. No.: 11/659,392

(22) PCT Filed: Jul. 28, 2005

(86) PCT No.: PCT/EP2005/008212

§ 371 (c)(1),
(2), (4) Date: Feb. 5, 2007

(87) PCT Pub. No.: WO2006/015731

PCT Pub. Date: Feb. 16, 2006

(65) Prior Publication Data

US 2007/0200399 A1  Aug. 30, 2007

(30) Foreign Application Priority Data

Aug. 11, 2004  (IT) ................................. VI04A0204

(51) Int. Cl.
*B62J 1/00* (2006.01)
(52) U.S. Cl. ...................................................... 297/202
(58) Field of Classification Search ................. 297/202, 297/195.1, 214, 215.16
See application file for complete search history.

(56) References Cited

U.S. PATENT DOCUMENTS

| 605,673 | A | 6/1898 | Hunt |
| 1,858,477 | A | 5/1932 | Blake |
| 5,011,222 | A | 4/1991 | Yates et al. |
| 5,365,205 | A | 11/1994 | Wong |
| 5,387,025 | A | 2/1995 | Denisar |
| 5,873,626 | A | 2/1999 | Katz |
| 5,921,624 | A | 7/1999 | Wu |
| 6,030,035 | A | 2/2000 | Yates |
| 6,139,089 | A | 10/2000 | Troyer |

(Continued)

FOREIGN PATENT DOCUMENTS

DE           82605         10/1894

(Continued)

OTHER PUBLICATIONS

Development of a New Geometric Bicycle Saddle for the Maintenance of Genital-Perineal Vascular Perfusion, J. Sexual Med, vol. 2, Issue 5, 605-611.

(Continued)

*Primary Examiner*—Milton Nelson, Jr.
(74) *Attorney, Agent, or Firm*—Bucknam and Archer

(57) ABSTRACT

This relates to a bicycle saddle of the type that presents two identical portions (1, 1') longitudinally symmetrical. Thanks to its special conformation, said saddle permits the cyclist to avoid the occurrence of pathologies normally caused by the use of a racing saddle of commonly known types, eliminating the crushing of the vascular structure of the perineum, as well as the testicles of male cyclists and the clitoris of female cyclists. The special geometry permits a pedaling action without causing friction of the thigh muscles, in particular the delicate and adducent muscles.

9 Claims, 19 Drawing Sheets

U.S. PATENT DOCUMENTS

| | | | |
|---|---|---|---|
| 6,149,230 | A | 11/2000 | Bontrager |
| 6,224,151 | B1 | 5/2001 | McMullen, Jr. |
| 6,231,122 | B1 | 5/2001 | Goldstein |
| 6,257,662 | B1 | 7/2001 | Yates |
| 6,450,572 | B1 | 9/2002 | Kuipers |
| 7,537,281 | B2 * | 5/2009 | Riondato .................. 297/202 |
| 2001/0004765 | A1 | 6/2001 | Miyagawa |
| 2003/0071498 | A1 | 4/2003 | Yu |

FOREIGN PATENT DOCUMENTS

| | | |
|---|---|---|
| DE | 84678 | 6/1895 |
| DE | 29823624 | 10/1998 |
| DE | 29907473 | 9/1999 |
| EP | 1281607 A1 | 7/2002 |
| EP | 1293422 | 3/2003 |
| WO | WO92/11175 | 7/1992 |
| WO | WO03/039942 A1 | 5/1993 |
| WO | WO9525662 | 9/1995 |
| WO | WO9914103 | 3/1999 |
| WO | WO03/039942 A1 | 5/2003 |
| WO | WO2004/069636 | 8/2004 |

OTHER PUBLICATIONS

Mechanism of venous leakage: a prospective clinicopathological correlation of corporeal function and structure. J. Urol. Oct. 1996; 156(4) 1320-9) Panorama Magazine Nov. 2001 (Abstract).

Selle Italia "Saddle Catalouge 2003" Sep. 2002, Selle Italia, Italy, XP0022847753.

Mechanism of venous leakage: a prospective clinicopathological correlation of corporeal function and structure. J. Urol. Oct. 1996; 156(4) 1320-9) Panorama Magazine Nov. 2001 (to follow).

Selle Italia: "Saddle Catalogue 2003" Sep. 2002, Selle Italia , Italy. XP002284753 p. 17-p. 18 p. 51-p. 52 p. 56 (to follow).

International Search Report for PCT/EP2005/008212.

* cited by examiner

BICYCLE SADDLE

CROSS REFERENCE TO RELATED APPLICATIONS

Applicant claims priority under 35 U.S.C. §119 of Italian Application VI 2004 A 000204 filed Aug. 11, 2004. Applicant also claims priority under 35 U.S.C. §365 of PCT/EP2005/008212 filed Jul. 28, 2005. The international application under PCT article 21(2) was published in English.

BACKGROUND OF THE INVENTION

The present invention relates to a bicycle saddle. In particular, the saddle according to the invention is the result of an improvement of the saddle described in my earlier U.S. Pat. No. 7,537,281, granted May 26, 2009.

In order to understand the characteristics of the bicycle saddle according to the invention, and the structural ergonomic difference that distinguishes it from all other bicycle saddles available on the market today, the innovation should be presented in a context of medical science, which in the world of professional athletes, constitutes an important work instrument necessary to obtain better performance.

In order to demonstrate specifically what problems bicycle saddles currently available on the market can provoke for cyclists who use bicycles for long or short road distances, scientific research has been carried out in the field of Urology.

Many urologists in certain universities in both the United States and in Europe carried out research studies between 1986 and 2002, on the effect of the temporary, and in many cases, even the permanent lack of sensitivity in the penis, that occurs as a result of the vascular compression of the perineal structures when the cyclist is seated on the bicycle saddles that are still on the market; the data obtained from this research have been used by urologists who have deducted that the long narrow tip of the saddle is the aspect which causes the aforesaid health problems.

For a correct definition, we will provide summary of two scientific research surveys conducted by the most famous urologists. The first, the American urologist Irwin Goldstein, who in the research survey he conducted in 1996, already suggested that there existed a danger of impotence for men who rode bicycles. Goldstein sustained that the problem lay in the saddle; this because of the form of the saddle with the narrow hard tip which caused a pressing of the perineum (Article published in the magazine Panorama dated 29 Nov. 2001) and scientific study conducted with Nehra A., Goldstein I., Pabby A., Nugent M., Huang Y H., de las Morenas A., Krane R J., Udelson D., Saenz de Tejada I., Moreland R B. Mechanism of venous leakage: a prospective clinicopathological correlation of corporeal function and structure. J. Urol. 1996 October; 156(4)1320-9).

The second urologist, Ulrich Schwarzer of THE DEPARTMENT OF UROLOGY, UNIVERSITY MEDICAL CENTRE OF COLOGNE, 50924 GERMANY, conducted with Frank Sommer, Theodor Klotz, Claus Cremer, Udo Englemann, first in 1999, then again in 2002.

The conclusions of this study states the following:

It was possible to demonstrate that the most important factor for protecting the blood flow of the penis, does not depend on the amount of padding, but on the length of the saddle, which can prevent the compression of the structures of the pelvic floor, and the compression of the deep artery and vein of the penis on the pubic arch.

Below is a list of various documents concerning state of the art in relation to the present finding including brief comments:

U.S. Pat. No. 6,139,089—saddle that is ergonomically unsuitable for use on bicycles for touring or bike racing.

U.S. Pat. No. 5,387,025—saddle which house only the muscles of hip and which prevents hip articulation during pedal action; moreover since the ischial-pubic rami do not find a support, the whole weight of the human body trunk is supported by the hands on the handlebars.

Patent No. DE 298 23 624 U1—the saddle presents the flat and very wide rear portion, and when the cyclist is seated, the coccyx touches the surface of the saddle and the articulation of the hip is prevented even further; the two front parts are long and narrow and interfere with the cremasteric fascia surrounding the spermatic cord provoking pain in the testicles.

KAISERLICHES PATENTSHRIFT no. 84678—the saddle presents two very wide flat rear parts; when the cyclist is seated the coccyx touches the surface and the articulation of the hip is limited during the pedalling action; while the two front tips are long and narrow and interfere with the cremasteric fascia surrounding the spermatic cord provoking pain in the testicles; the front centre line channel is too short to avoid the compression of the pelvic floor structures, thus limiting the blood flow of the penis.

KAISERLICHES PATENTSHRIFT no. 82605—the saddle presents very wide flat rear parts; when the cyclist is seated the coccyx touches the surface of the saddle and the articulation of the hip is limited during the pedalling action; while the front tips are long and narrow and interfere with the cremasteric fascia surrounding the spermatic cord provoking pain in the testicles;

U.S. Pat. No. 5,873,626—from the drawing it is obvious that this refers to a small saddle, where the external parts of the hip muscles are housed and the articulation is limited by the shape of the front tips which are directed upwards.

U.S. Pat. No. 1,858,477—this is a motorcycle saddle with a very wide perimeter, which if used on a bicycle, will limit pedalling action considerably.

U.S. Pat. No. 605,673—saddle with a long narrow tip, and during use, this causes the compression of the pudenda arteries, of the prostate, the body, the deep dorsal artery and vein of the penis and testicles, thus compromising the blood flow of the penis.

U.S. Pat. No. 6,224,151 B1,—saddle with the flat rear surface part, so that when the cyclist is seated, the coccyx touches the saddle surface; the tip is long and narrow with a centre channel 24, ergonomically very narrow, and during bicycle use, this causes the compression of the pudenda arteries, of the prostate, the deep dorsal artery and vein of the penis and testicles, thus compromising the blood flow of the penis. The tip 16 has a rounded shape in appearance.

EUROPEAN Patent No. EP 1 281 607 A1.—the saddle has the long narrow tip, and during bicycle use, this causes the compression of the pudenda arteries, of the prostate, the deep dorsal artery and vein of the penis and testicles, thus compromising the blood flow of the penis.

INTERNATIONAL Patent PUBLICATION no. WO 03/039942A1—the saddle has the long narrow tip, and during bicycle use, this causes the compression of the pudenda arteries, of the prostate, the deep dorsal artery ad vein of the penis and testicles, thus compromising the blood flow of the penis.

U.S. Pat. No. 5,921,624—the saddle has the long narrow tip, and during bicycle use, this causes the compression of the pudenda arteries, of the prostate, the deep dorsal artery and vein of the penis and testicles, thus compromising the blood flow of the penis.

U.S. Pat. No. 6,030,035—the saddle has a flat rear surface and when the cyclist is seated, the coccyx touches the saddle surface, the tip is long and narrow, and during bicycle use, this causes the compression of the pudenda arteries, of the prostate, the deep dorsal artery and vein of the penis and testicles, thus compromising the blood flow of the penis.

U.S. Pat. No. 5,011,222—saddle has the rear part 15, 14, 15 with a convex shape in an upward direction with a flat surface and when the cyclist is seated, the coccyx touches the saddle surface, the tip is long and narrow, and during bicycle use, this causes the compression of the pudenda arteries, of the prostate, the deep dorsal artery and vein of the penis and testicles, thus compromising the blood flow of the penis.

INTERNATIONAL Patent No. 99/14103—saddle has the flat rear surface and when the cyclist is seated, the coccyx touches the surface; the tip is long and narrow with a narrow centre channel and during bicycle use this causes the compression of the pudenda arteries, of the prostate, the deep dorsal artery and vein of the penis and testicles, thus compromising the blood flow of the penis.

U.S. Pat. No. 6,257,662 B1—the saddle has a long narrow tip and during bicycle use, this causes the compression of the pudenda arteries, of the prostate, the deep dorsal artery and vein of the penis and testicles, thus compromising the blood flow of the penis.

U.S. Pat. No. 6,149,230—the saddle has a long narrow tip and during bicycle use, this causes the compression of the pudenda arteries, of the prostate, the deep dorsal artery and vein of the penis and testicles, thus compromising the blood flow of the penis; the terminal rounded part is limited to being simply for the sake of appearance.

SELLE ITALIA No. XP-002284753—the PROLINK ZERO saddles have a long narrow tip and when during their use, this causes the compression of the pudenda arteries, of the prostate, the deep dorsal artery and vein of the penis and testicles, thus compromising the blood flow of the penis; the terminal end shape of the tip which is rounded or slightly convex in a downward direction, is attributed for the sake of appearance and not for ergonomic reasons.

U.S. Pat. No. 6,450,572 B1—saddle has a long and narrow tip with a narrow centre channel and during bicycle use this causes the compression of the pudenda arteries, of the prostate, the deep dorsal artery and vein of the penis and testicles, thus compromising the blood flow of the penis; the terminal part of the tip is rounded in a downward direction, and is for the sake of appearance and not for ergonomic reasons.

U.S. Pat. No. 5,365,205—the saddle has a long and narrow and during bicycle use this causes the compression of the pudenda arteries, of the prostate, the deep dorsal artery and vein of the penis and testicles, thus compromising the blood flow of the penis.

BUNDESREPUBLIK DEUTSCHELAND Patent no. DE 299 07 473 U1 dated, 9 Sep. 1999—the saddle has a flat rear part and when the cyclist is seated, the coccyx touches its surface; the tip is long and narrow and during bicycle use this causes the compression of the pudenda arteries, of the prostate, the deep dorsal artery and vein of the penis and testicles, thus compromising the blood flow of the penis.

U.S. Pat. No. 6,231,122 B1.—the saddle has a long and narrow and during bicycle use this causes the compression of the pudenda arteries, of the prostate, the deep dorsal artery and vein of the penis and testicles, thus compromising the blood flow of the penis.

INTERNATIONAL PUBLICATION No. WO 92/11175—the saddle has a long and narrow and during bicycle use this causes the compression of the pudenda arteries, of the prostate, the deep dorsal artery and vein of the penis and testicles, thus compromising the blood flow of the penis.—US Patent No. US 2001/0045765 A1—the saddle has a long and narrow and during bicycle use this causes the compression of the pudenda arteries, of the prostate, the deep dorsal artery and vein of the penis and testicles, thus compromising the blood flow of the penis; the end shape of the tip slightly convex in a downward direction, is simply attributed for the sake of appearance and not for ergonomic reasons.

SUMMARY OF THE INVENTION

The aforesaid documents concerning bicycle saddles, and in particular, racing bicycles saddles, do not satisfy the indications of the urological medical research for the protection of the blood flow of the penis, and furthermore, only a part of these saddles present a geometry which is compatible with the needs of the cyclist, and especially with those of professional athletes.

According to the data acquired above, it is obvious that a bicycle saddle must have a central channel of a suitable width in order to avoid the compression of the vascular structures of the perineum: and therefore in order to obtain this, the saddle shall be constructed in a manner so that the cyclist is supported on its structure exclusively on his gluteus muscles, the ischiatic tuberosities, and the ischial pubic rami and the saddle on its sides must have a geometry that during the pedalling action, prevents friction against the gracilis and adducent muscles.

The saddle according to the invention presents a seat that is uniformly distributed on the gluteus muscles, the ischiatic tuberosity, and the pubic ischium while maintaining the perineal plane free; the eagle beak tip also permits the external genitals to be free of compression. The rear width most preferred by cyclists is approximately 130-140 mm narrowing inwards to a front width of approximately 40-45 mm where the structures then slope downwards on a non-limiting angle of 30°-45° for racing bicycle saddle, and a non limiting angle of 75° for touring bicycle saddle. The geometry of the saddle according to the finding follows the shape of the thigh muscles, thus avoiding friction of the gracilis and adducent muscles that could lead to irritating problems in the lower limbs during pedalling action. In fact, it is a typical habit of professional cyclists to pedal with their knees averagely directed towards the bicycle frame in order to increase their strength and sports performance.

BRIEF DESCRIPTION OF THE DRAWINGS

The saddle according to the invention will now be illustrated and described in detail, with reference to certain particular embodiments thereof, provided by way of non-limiting examples, with the help of the drawing tables wherein:

FIG. 6 A shows the compression that the ischial pubic ramus exerts on the padding when the cyclist is seated on the saddle;

DETAILED DESCRIPTION OF THE INVENTION

The saddle according to the invention is designed for use on racing bicycles, with non-limiting length of 27 cm, and rear width of approximately 13-14 cm, on a touring bicycle, with non-limiting length of 20 cm, and rear width of approximately 18-22 cm.

Figure 1:
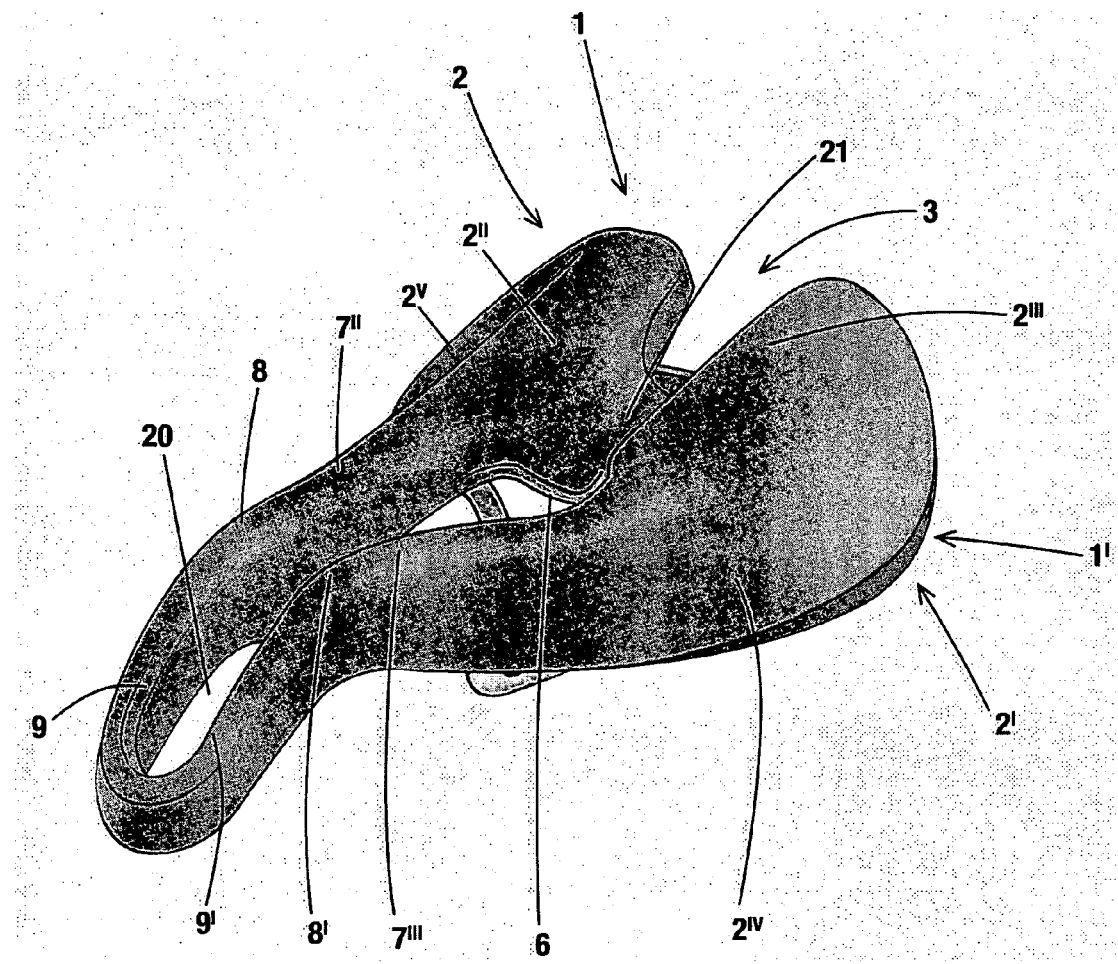
FIG. 1 is an overall perspective view of the saddle according to the invention.

As can be seen in FIG. 1 where the saddle is seen in perspective from above, the saddle presents two identical portions 1, 1', longitudinally symmetrical, with a long central channel 20 at the front part of its median zone. Each of these identical portions presents a rear part 2, 2', that conjointly for the racing bicycles have a non-limiting width of 13-14 cm, and a non limiting width of 18-22 cm for touring bicycles. The two parts 2, 2' are reciprocally united by a hollow-shaped section 21. As can be seen in particular in FIG. 2, their rear portion is sloped in an upward direction on an angle of approximately between 10 and 20 degrees.

The parts in closest proximity to the central hollow 21 of parts 2 and 2' shown in the figure with reference numerals 2" and 2''', are substantially flat and have an overall dimension of approximately 7 cm, after which they slope downwards in relation to the vertical plane on an angle that varies between approximately 45° and 60°, terminating with the side parts 2'''' and 2'''''.

Figure 11:
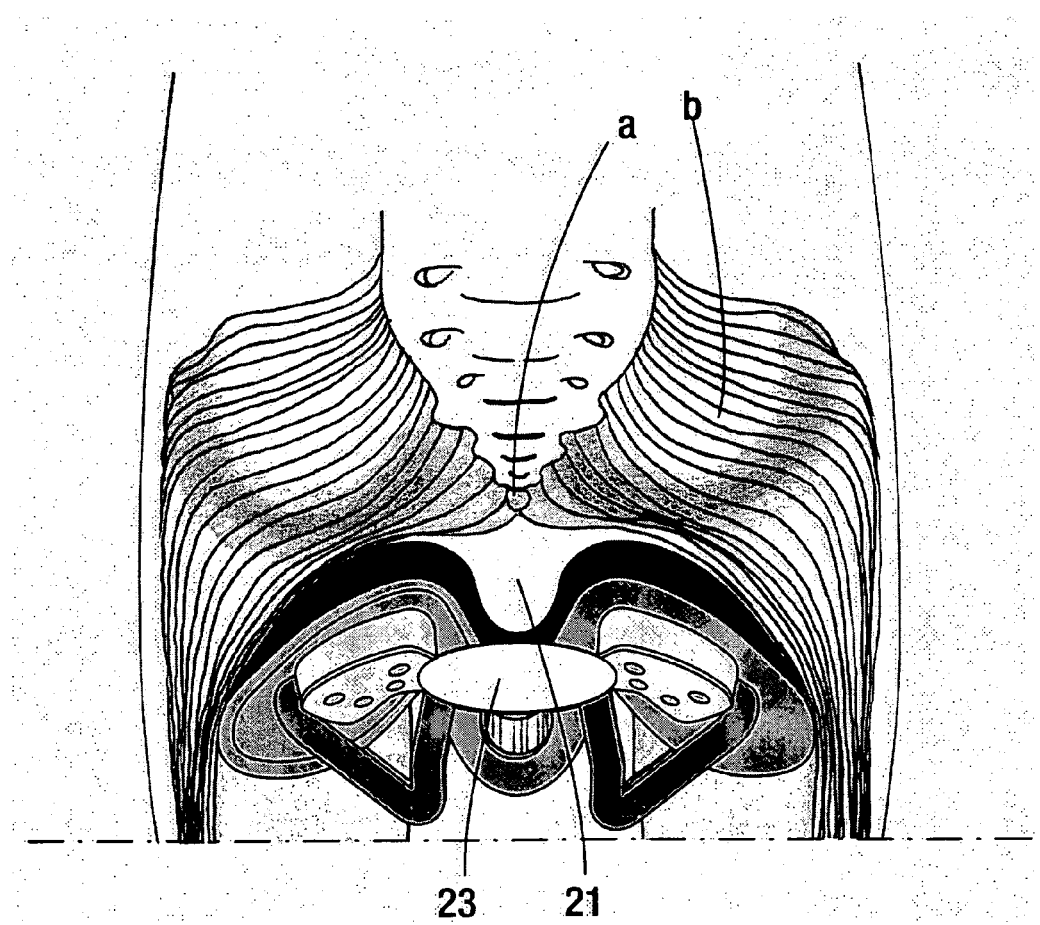
FIG. 11 is a rear view of the saddle according to the finding and the dissection of the coccyx and gluteus muscles housed on the rear part of the saddle according to the invention.

In the following anatomical figures, it will be made clear that the flat parts 2", 2''' serve to support the gluteus muscles and the ischiatic tuberosities, and vice versa on the sloped parts 2'''', 2''''', only the gluteus muscles are supported, as can be seen in FIG. 11.

Figure 3:
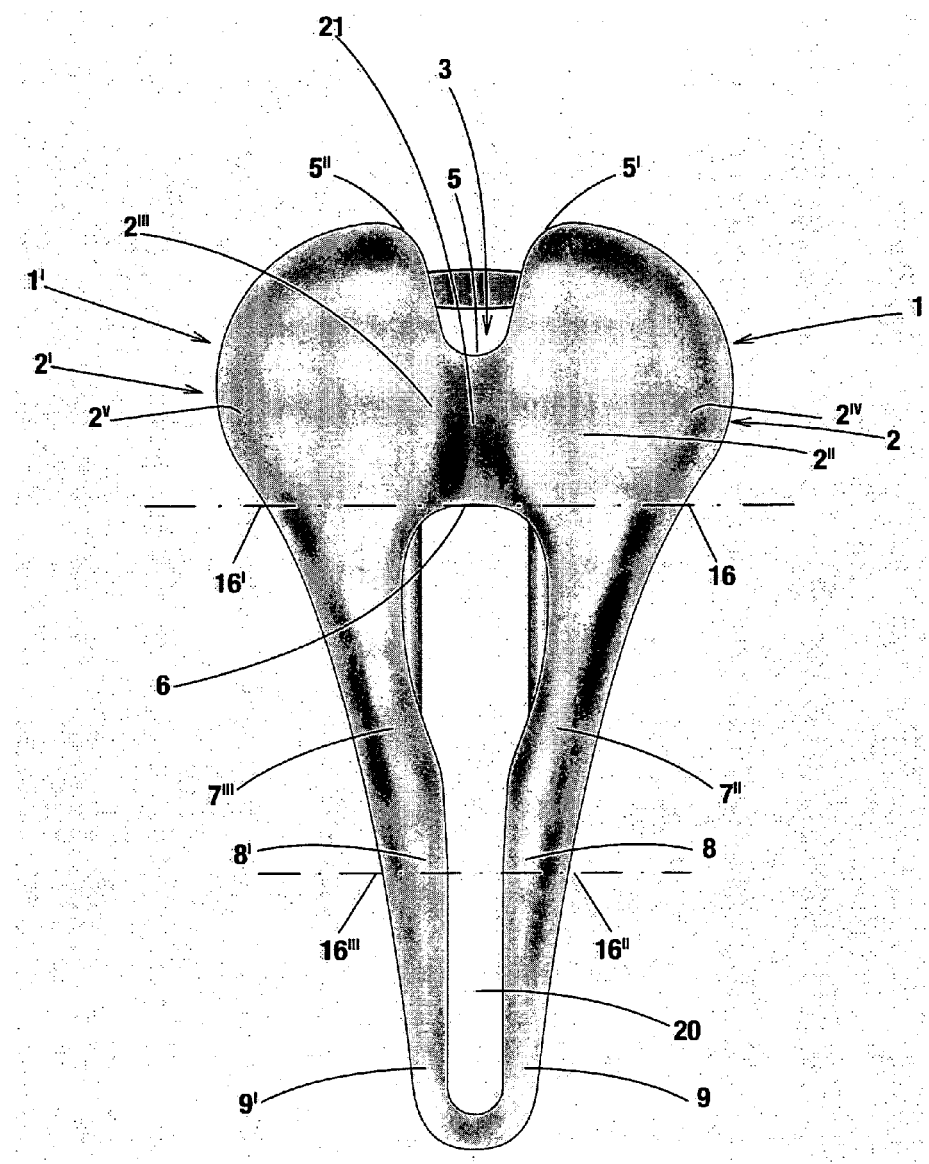
FIG. 3 is a top plan view of the saddle according to the invention.

As can be seen in FIG. 1, but also in FIG. 3, at their rear intermediate zone, parts 2, 2' are configured to resemble a recess 3, that substantially presents a dovetail shape whose ends 5', 5" are at a reciprocal but non-limiting distance from each other of approximately 2.5-3 cm, terminating with a front end 5 in a semi-circular shape. In fact, the hollow 21 begins from point 5, and as seen previously, said hollow serve as a connecting element for the two parts 2, 2'. Such hollow has a variable length between approximately 4-6 cm and a depth of approximately 1.5 cm. Its presence is fundamental in order to prevents the coccyx from touching the saddle surface, and especially in cases where the road surface is particularly uneven.

The fact that the coccyx does not come into contact with the saddle surface prevents micro-traumas that could occur, provoking considerable pain on the vertebral column. The rear parts 2", 2''', are united to the front portion 7", 7''', by a slight slope. At this point the saddle has a total non-limiting width of 7 cm.

The front portions 7", 7''', are inclined in an upward direction at a non-limiting angle of about 5° for racing saddles and a non limiting angle of approximately 10°-20° for touring saddles, then they are destined to approach each other considerably in a reciprocal manner until they are at a reciprocal distance of approximately 4-4.5 cm from each other, at points 8, 8'. In these zones, the side of the saddle slopes in a perpendicular direction downwards, and the corners are suitably rounded to prevent any irritating contact with the skin of the thigh.

The ischiatic tuberosities and ischial pubic rami are positioned above these front parts of the saddle, and therefore the ischial pubic rami support the concentrated load of the human body which is distributed in a uniform manner for its complete length on the support surface, when the cyclist is seated on the saddle according to the present invention.

Moreover, the ischial pubic rami are supported on the front parts 7", 7''', at the points 8, 8' serve to support a part of the weight of the trunk of the human body when the cyclist's hands are positioned on the bicycle handlebars.

Figure 2:
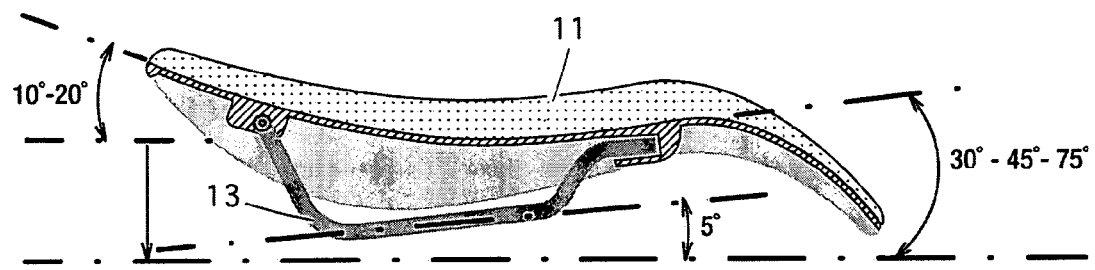
FIG. 2 is a longitudinal-vertical section view of the saddle according to the invention.

Lastly at the front terminal part of the saddle 8, 8', where the seat of the pelvis terminates, are the sections 9, 9', sloped downwards in an eagle-beak configuration on a non-limiting angle of 30°-45° for the racing saddle and a non-limiting angle of 75° for the touring saddle, as can be seen in FIG. 2. At the front end of the saddle the two sections 9, 9' unite in a substantially semi-circular form with a diameter of approximately 4-3.5 cm to maintain the two portions 1, 1' united at the front.

Figure 9:
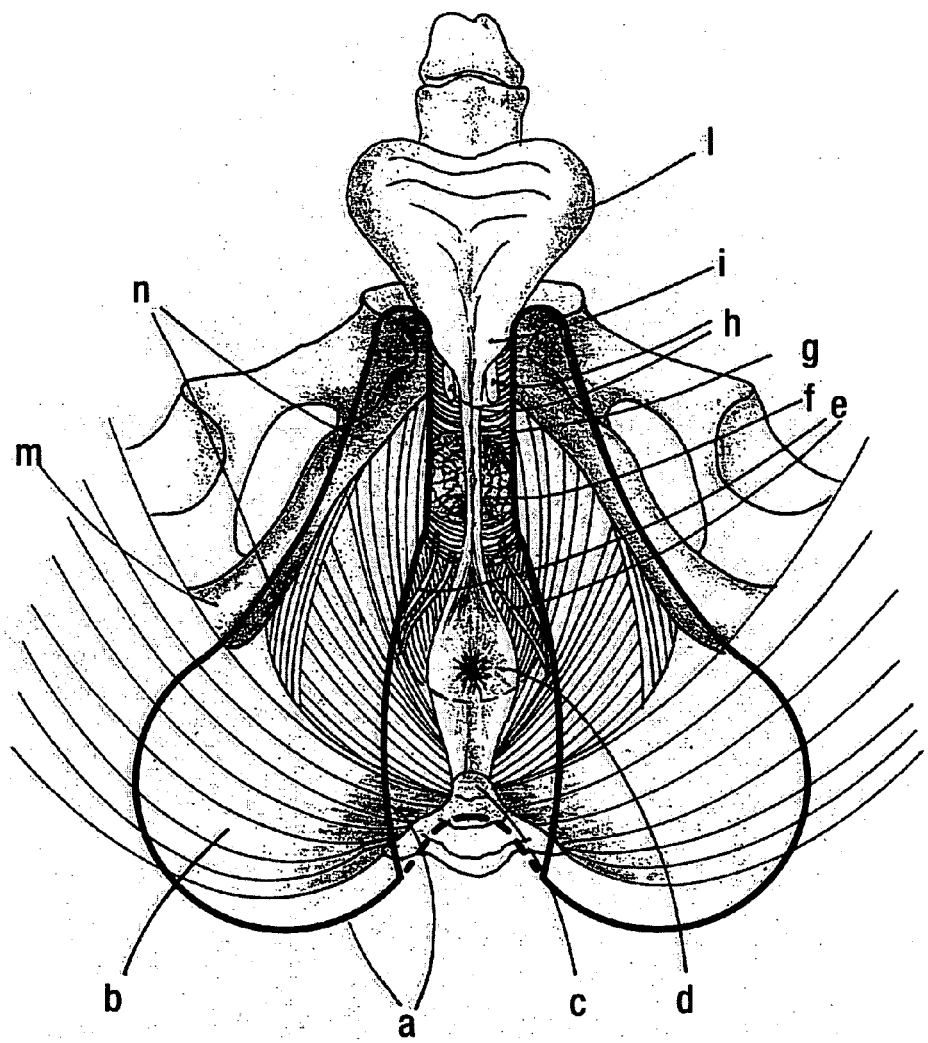
FIG. 9 is a horizontal dissection of the pelvic floor structures, the ischiatic tuberosities, the ischial pubic rami and the gluteus muscles, housed on the surface of the saddle according to the invention.
Figure 10:
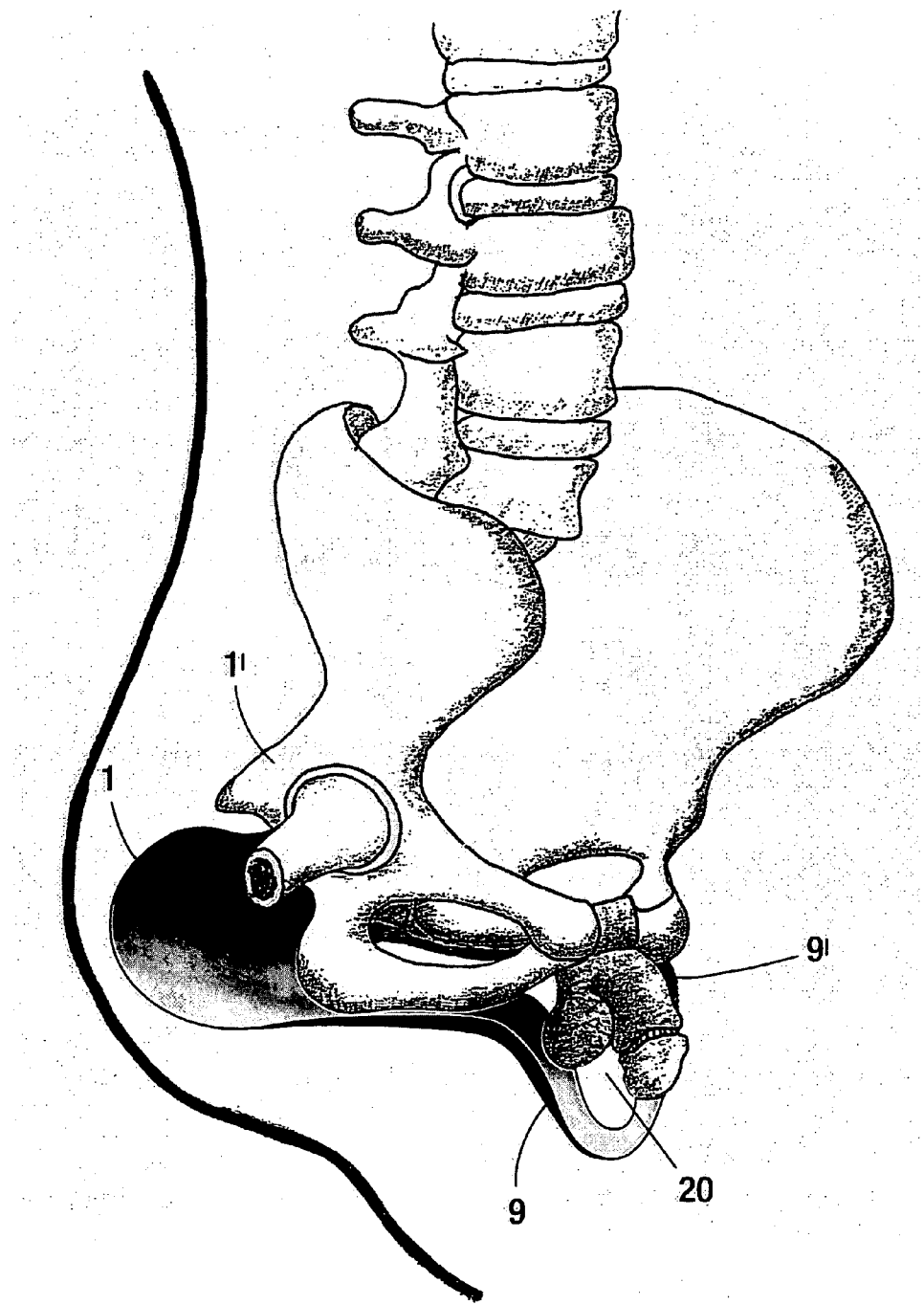
FIG. 10 is a perspective view of the coxal bone positioned on the saddle according to the invention, where the free articulation of the hip is easily visible as well as that of the body of the penis and testicles arranged between the pubic arch and the saddle.

Such a strong slope of sections 9, 9' FIGS. 9, 10, prevents any crushing of the testicles, in the case of men, and the clitoris, in the case of women, when the saddle is in use, in compliance with the above-mentioned scientific urological research surveys.

Moreover, this also prevents the compression of the body of the penis, the deep dorsal artery and vein, thus maintaining normal blood flow.

The parts 9, 9', which on the racing bicycle saddle are sloped downwards at a non-limiting angle of 30°-45° are of considerable help to the athlete during the final sprint, or during timing races, at the moment when he moves the pelvis forwards, to provide a minimum support for the gluteus muscles, thus preventing all compression on the anus and in particular, on the prostate.

On observing FIG. 3, it can be seen that the saddle has a particularly streamlined dynamic form. This streamlined form is able to satisfy the professional athlete in particular, since he should never feel any irritation or pain when pedalling in training and during a race. With reference to the central channel 20 in particular, at its rear end it has a semi-circular form with a diameter that varies between approximately 3 and 5 cm.

Moving further forward, the channel 20 narrows to a width of approximately 2.5 cm terminating at the front with a zone that also has a substantially semi-circular configuration.

At the rear wider part of the channel, the anus, the prostate (for male cyclists naturally) can be housed comfortably, the prostate measuring approximately 2.5 cm in diameter according to the scientific tests performed; and the pudenda arteries, dorsal veins and arteries and the body of the penis and the testicles will be positioned on parts 9, 9'. Since the central channel 20 is open, female cyclists will not be subjected to any pressure on the vagina, which maintains constant air flow, an aspect which is important for the preservation of the complex interaction between the micro-organisms that compose the vaginal flora; the vestibule, the inner and outer labia and the clitoris being positioned at the sections 8, 8'.

Therefore channel 20 fully satisfies all the aforesaid requirements provided in the scientific urological research survey; in fact the saddle according to the invention was subjected to scientific urological testing on 29 young healthy cyclists, with a body weight between 45 and 70 kg. and aged between 18 and 30 years old, first simply seated on the saddle of the invention for a period of 15 minutes, followed by a pedalling action on said saddle for a further 15 minutes, measuring the blood flow of the perineal structures, using a Clark type electrode positioned on the gland of the cyclist's penis.

The data obtained and compared with the data of the latest scientific test performed by the Urologist Schwarzer demonstrate that the saddle according to the invention is statistically superior to the saddle that had given the best results in the survey, thus demonstrating the regular blood flow of the perineal vascular structures, both when seated, as well as during pedalling action.

In this relation, it is important to note that when using the saddle according to the invention, male cyclists felt no friction on the anus and on all of the penis skin surface, thus preventing any eventual rashes or dermatitis caused by friction. Moreover, the testicles are maintained constantly in the air flow, thus maintaining the temperature under 37°, which is the best possible temperature for normal seminal liquid production.

It should also be noted that in the intermediate part of the racing saddle (see FIG. 3), that is, the area defined approximately and respectively by points 16, 16" and 16', 16''', the saddle has a maximum width that permits the ischiatic tuberosities and the ischial pubic rami to be supported on their internal part.

This aspect is important, so that the attachment of the semi-tendinous muscles, the bicipital muscles of the femur, the gracili muscles, and also the perineal nerves and lower nerves of the buttock are not compressed in any way, thus maintaining regular sanguineous circulation, and consequently also the oxidation of the muscular fibres during pedalling action.

Figure 1A:
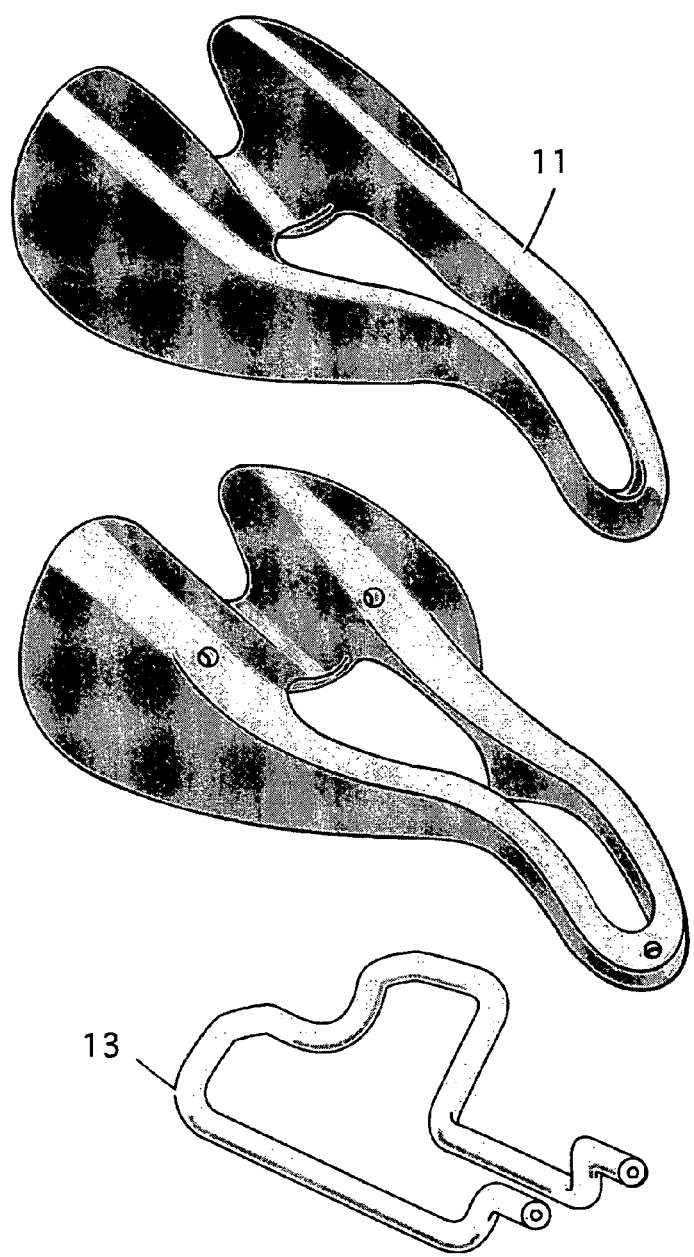
FIG. 1A is an exploded view of the elements that compose the saddle according to the invention.

Further on, FIG. 1A: exploded view of the main saddle components according to the invention of: (A) the padding that will mainly be covered in leather, (B) the supporting shell made in nylon plus a percentage of carbon or other plastic materials, and (C) support rail made of steel tubing.

FIG. 2: vertical longitudinal section we can observe the particular ergonomic form that characterises the saddle according to the invention.

The overlying padding 11, with a non-limiting thickness of 1-1.5 cm, in the front area, and a non-limiting thickness of 2-10 mm at the rear is made of a two-component polyurethane elastomer foam, or compact or foam polyurethane, or styrol-butylene-styrol, or vulcanized rubber foam, or some other plastic materials suitable for the needs of the saddle of the invention; each of these materials will be used in an appropriate manner in the various models that compose the range of saddles according to the invention. These materials which constitute the padding are able to support the body weight of the cyclist when he is seated on the saddle according to the invention, thus preventing the ischiatic tuberosities and ischial pubic rami from touching the underlying support shell.

The underlying support shell has a non-limiting thickness of approximately 2-3 mm, and is formed to perform an ergonomic function to house the gluteus muscles and a part of the ischiatic tuberosities and, in the front areas, the ischial pubic rami; due to this design and the absolute minimum of support surface, the cyclist's body weight is uniformly distributed on every square centimeter of the surface when he is seated on the saddle according to the invention, without the cyclist feeling any crushing or bruising of delicate parts of the perineal floor and the juncture of the muscles.

Basically, the saddle according to the invention is a small-sized saddle for a bicycle that fulfills the requirements of the amateur cyclist as well as those of the professional athlete.

Figure 4:
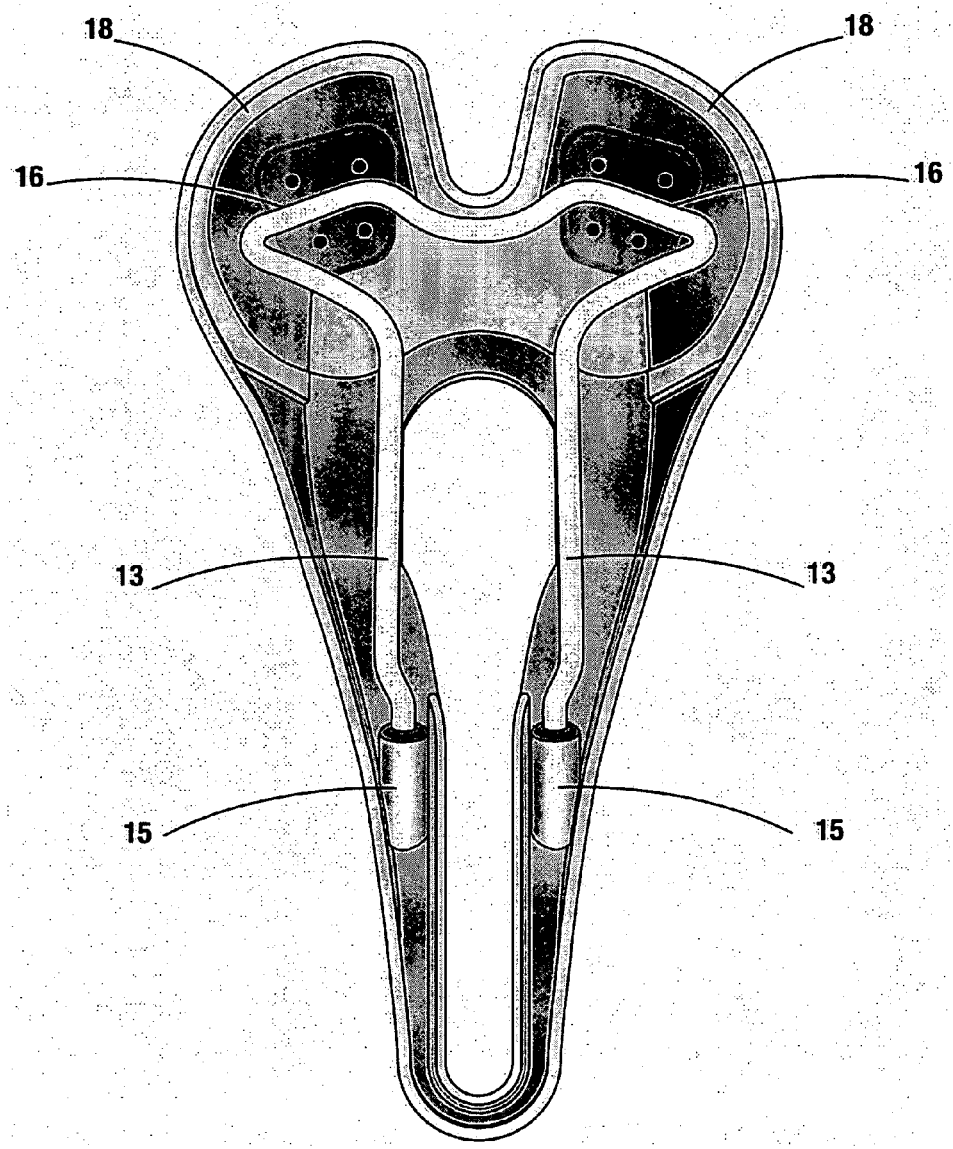
FIG. 4 is a bottom plan view of the saddle according to the invention.

The support rail 13 is fixed to the shell on special seats, in the front 15, on special pockets, at the rear 16, on supports pre-formed on the shell. In FIG. 4, the positioning and blocking of the rail in points 16, is composed in plan view of two prismatic raised elements on which will be fixated with self-threading screws two plates 22, 22' (FIG. 5) previously provided with holes for the screws, and united together by means of a plate 23, bearing the manufacturer's trademark, which can be seen in FIG. 11; a strip 18, with a width of approximately 6 mm, and approximately 3.5 mm thick, is applied around the perimeter, and on which the final part of the leather covering of the saddle according to the invention will be later glued and stapled.

Figure 5:
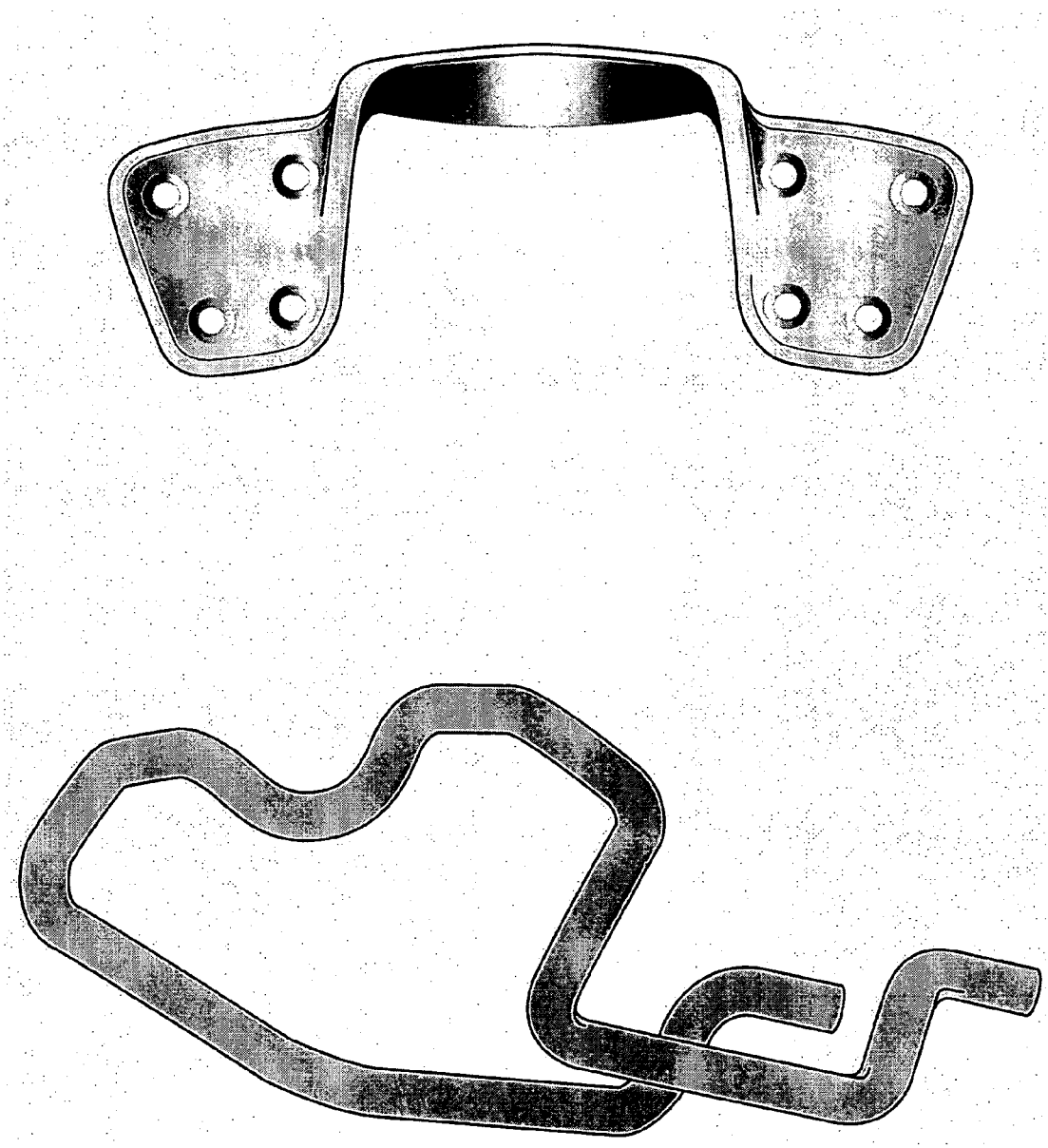
FIG. 5 is a view of the two fixing plates for the support rail and the perspective view of the particular support rail.

The support rail 13, FIG. 5, is formed in a single tube in stainless steel, aluminium, or titanium, or any other materials resistant and lightweight at the same time, with the rear part closed and facing upwards for approximately 4 cm and a width of approximately 10 cm in the upper area, and formed following the shape of the underlying surface of the saddle shell according to the invention. The saddle securely attached to the rail, which is in turn fixed to the bicycle support, remains always stable during the pedalling action of the cyclist, when the body weight is placed in an alternating manner on parts 1, 1' of the saddle according to the invention (see FIG. 8).

Below, with the relative drawings, are the descriptions of different ergonomic forms of the shell surface of the racing saddle and the touring saddle according to the invention.

Figure 6:
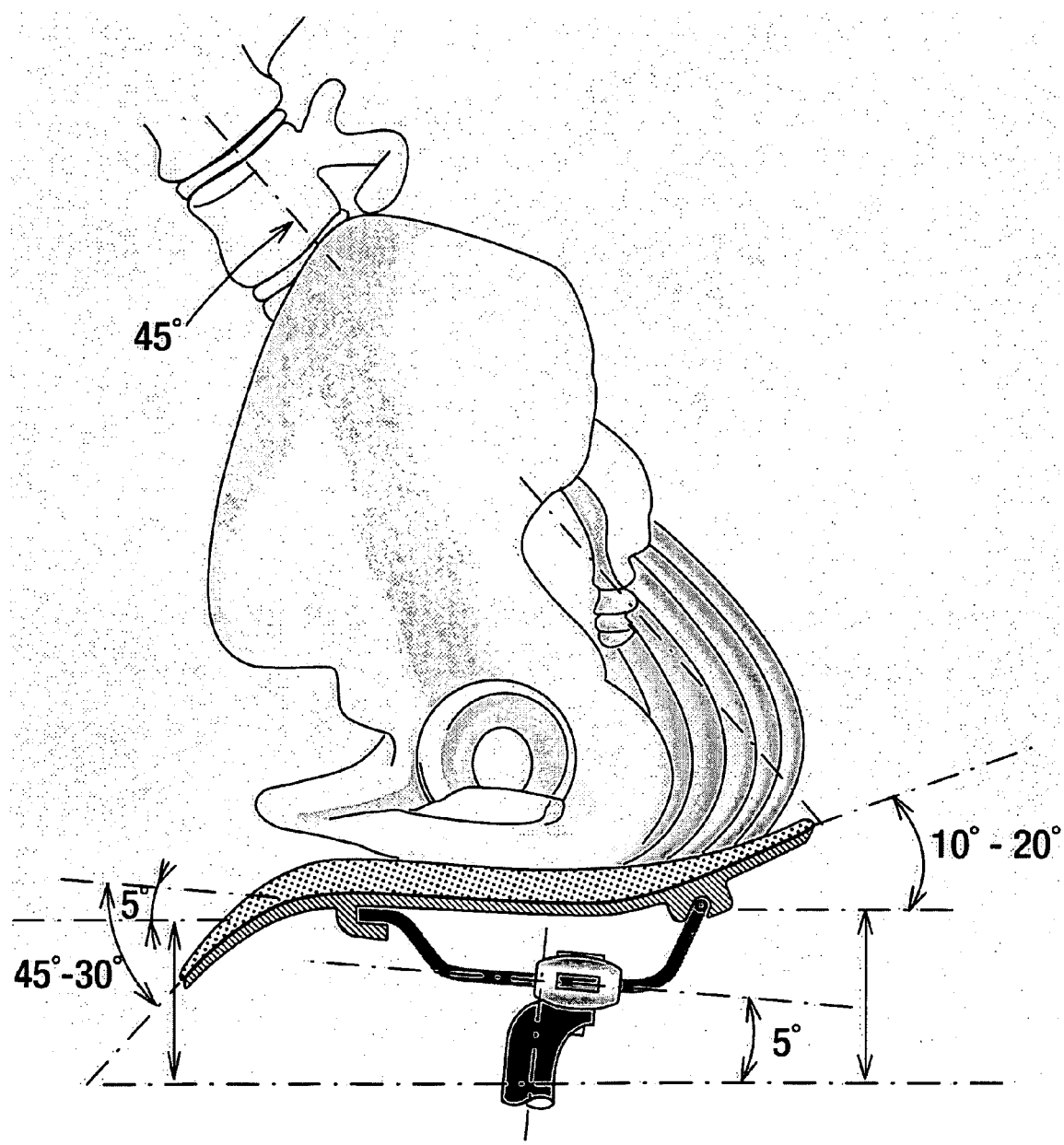
FIG. 6 is a longitudinal section of the racing bicycle saddle according to the invention and the lateral dissection of the coxal bone.
Figure 6A:
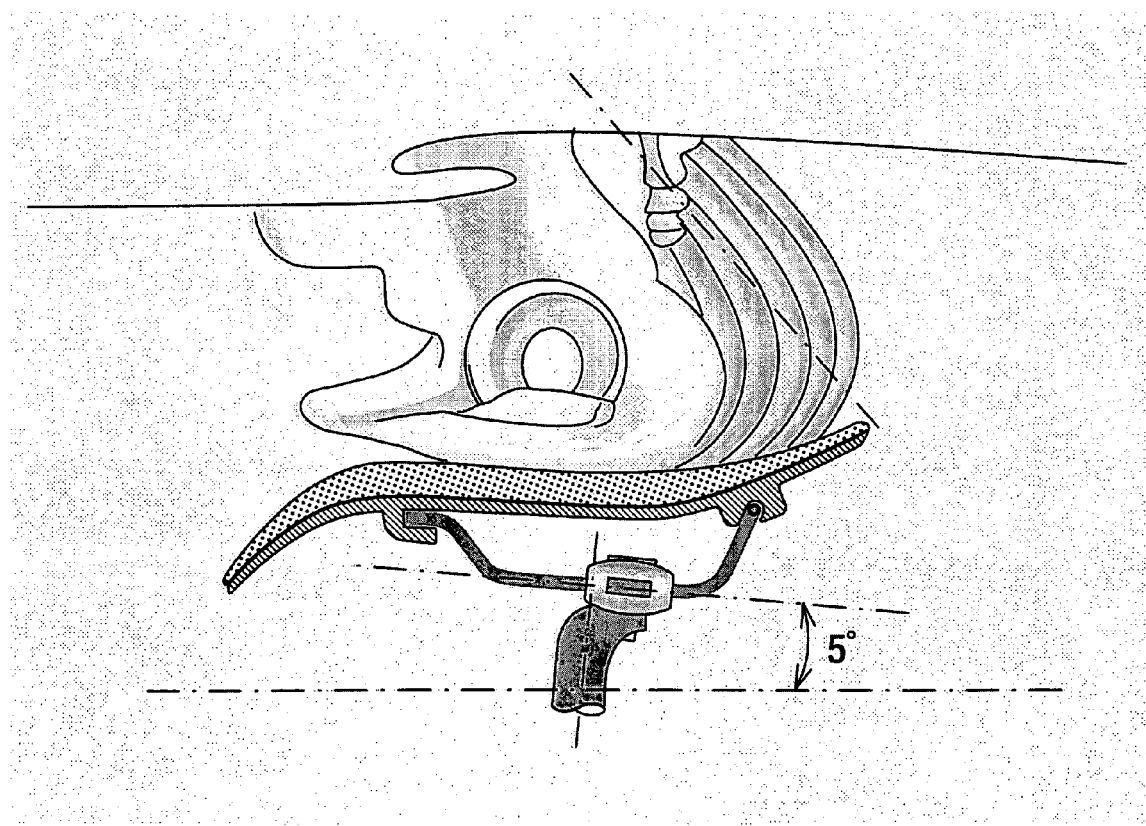

FIG. 6 shows the section of the racing saddle with the dissected coxal bone above it, arranged in a pedalling position of approximately 45°; FIG. 6A with the ischial pubic rami compressing the saddle padding with the weight of the human body; the front surface of the shell is directed in an upward direction on a non-limiting angle of only 5° to house the ischial pubic rami, which in this position, are moved in a downward direction, while the tip of the saddle moves downward at a non-limiting angle of approximately 30° or 45° to permit the professional athlete to place his gluteus muscles on it during the final sprint or during timing races; the gluteus muscles are supported on the rear part directed upwards at a non-limiting angle of 10°-20°.

Figure 7:
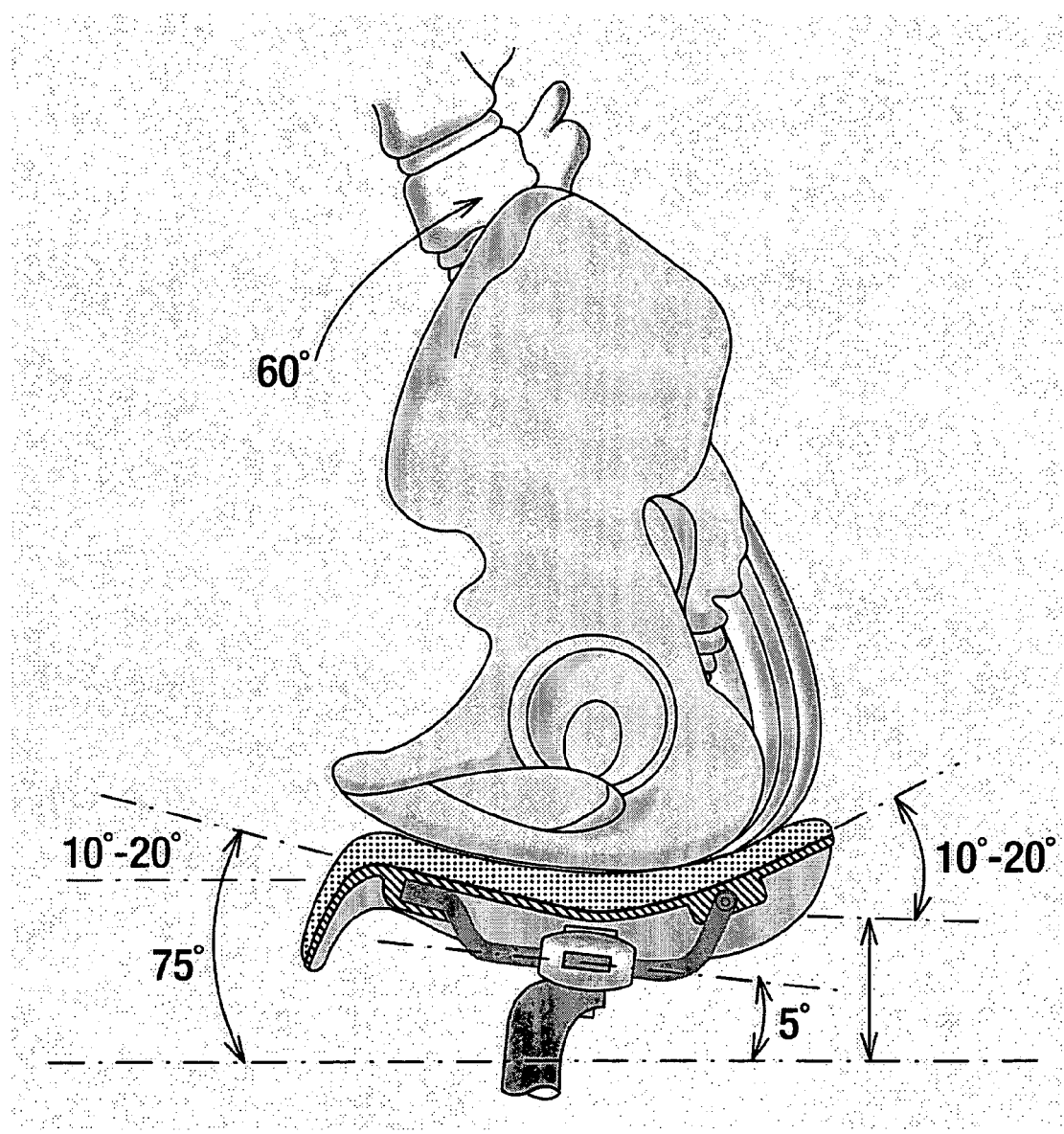
FIG. 7 is a longitudinal section of the touring bicycle saddle according to the invention and the lateral dissection of the coxal bone.
Figure 7A:
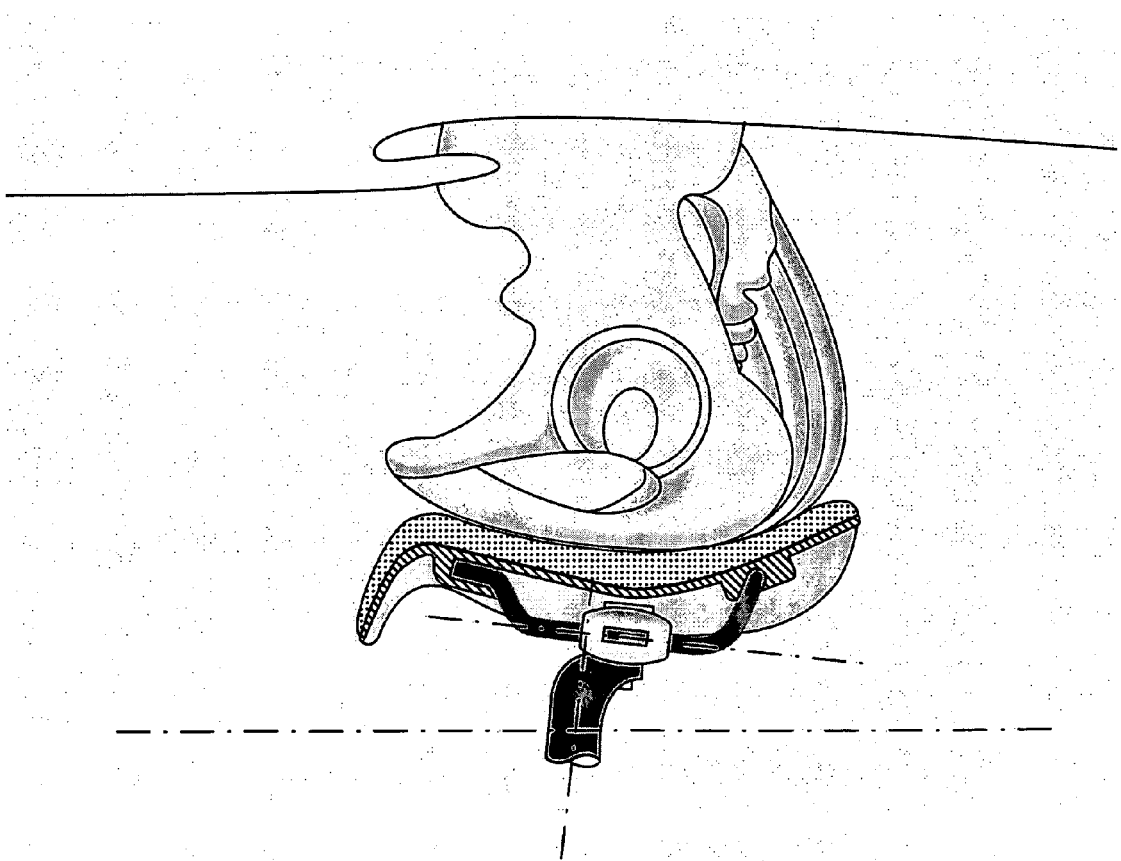
FIG. 7A shows the compression that the ischiatic tuberosity and the ischial pubic ramus exert on the padding when the cyclist is seated on the saddle.

FIG. 7 shows the section of the touring saddle with the dissected coxal bone above it, set in a pedalling position of approximately 60°; FIG. 7A shows the ischial pubic rami that compress the saddle padding under the weight of the human body; the front surface of the shell is directed in an upward direction on a non-limiting angle of 10°-20° to house the ischial pubic rami which in this touring position, are moved in a upward direction, while the tip is directed downwards at a non-limiting angle of approximately 75°; the gluteus muscles are supported on the rear part directed upwards at a non-limiting angle of 10°-20°.

Figure 8:
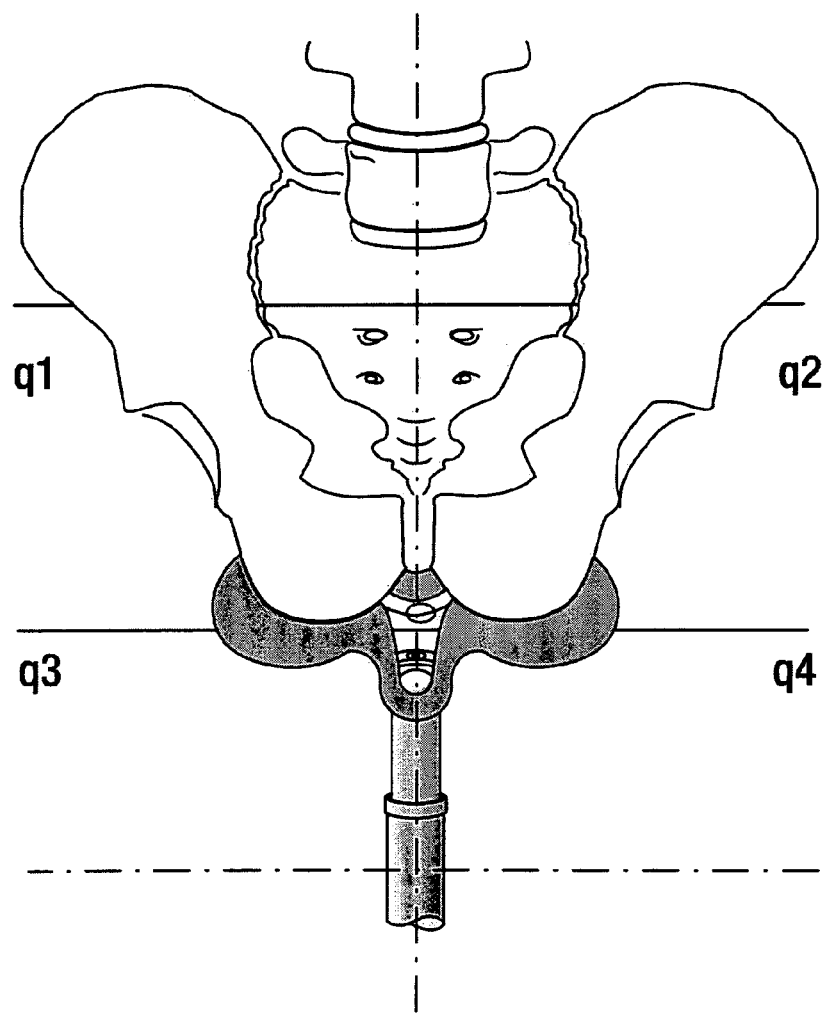
FIG. 8 is a front view of the saddle according to the invention with the coxal bone positioned on it is illustrated; this shows the space for the housing of the body of the penis between the pubic arch and the center channel of the saddle according to the invention, and the stable position of the four quadrants of the human body.

FIG. 8 shows a front view of the saddle according to the invention and a dissection of the coxal bone housed above the saddle surface of parts 1, 1'; the four quadrants—upper left hand q1, upper right hand q2, lower left hand q3, lower right hand q4, all remain in a perfectly stable position in the correct axis with the saddle during any kind of pedalling action even intense or excessive, also due to the above described support rail, thus permitting all the muscles of the lower limbs and other vital functions to interact in a uniform manner.

FIG. 9 shows the dissection of the perineal floor structures, the ischiatic tuberosities, ischial pubic rami, gluteus muscles and genitals, their position on the surface of the saddle; inside the channel 20, the coccyx, anus, pudenda arteries, prostate, body of the penis, deep dorsal vein and artery of the penis, penis skin, and testicles are housed without being subject to any compression, the same principle being applied to prevent compression on the vagina, inner and outer labia and the clitoris for female cyclists.

In this manner the blood flow of the penis is uninterrupted during the cyclist's pedalling action.
  a) perimeter of the saddle according to the finding
  b) gluteus muscles
  c) coccyx
  d) anus
  e) pudenda arteries
  f) body of prostate
  g) body of penis
  h) deep dorsal vein and artery of penis
  i) skin
  l) testicles
  m) ischiatic tuberosity
  n) ischial pubic rami FIG. 10 shows the perspective view of the dissection of the coxal bone positioned on the surface of the saddle according to the invention, demonstrating how the space occupied by the body of the penis and the testicles is free of any obstruction in points 8, 8' in FIG. 1, and parts 9, 9' (FIG. 10), which are directed downwards in eagle beak form in these zones at a non-limiting angle of 30°-45° for the racing saddle, and a non-limiting angle of 75° for the touring saddle.

Figure 12:
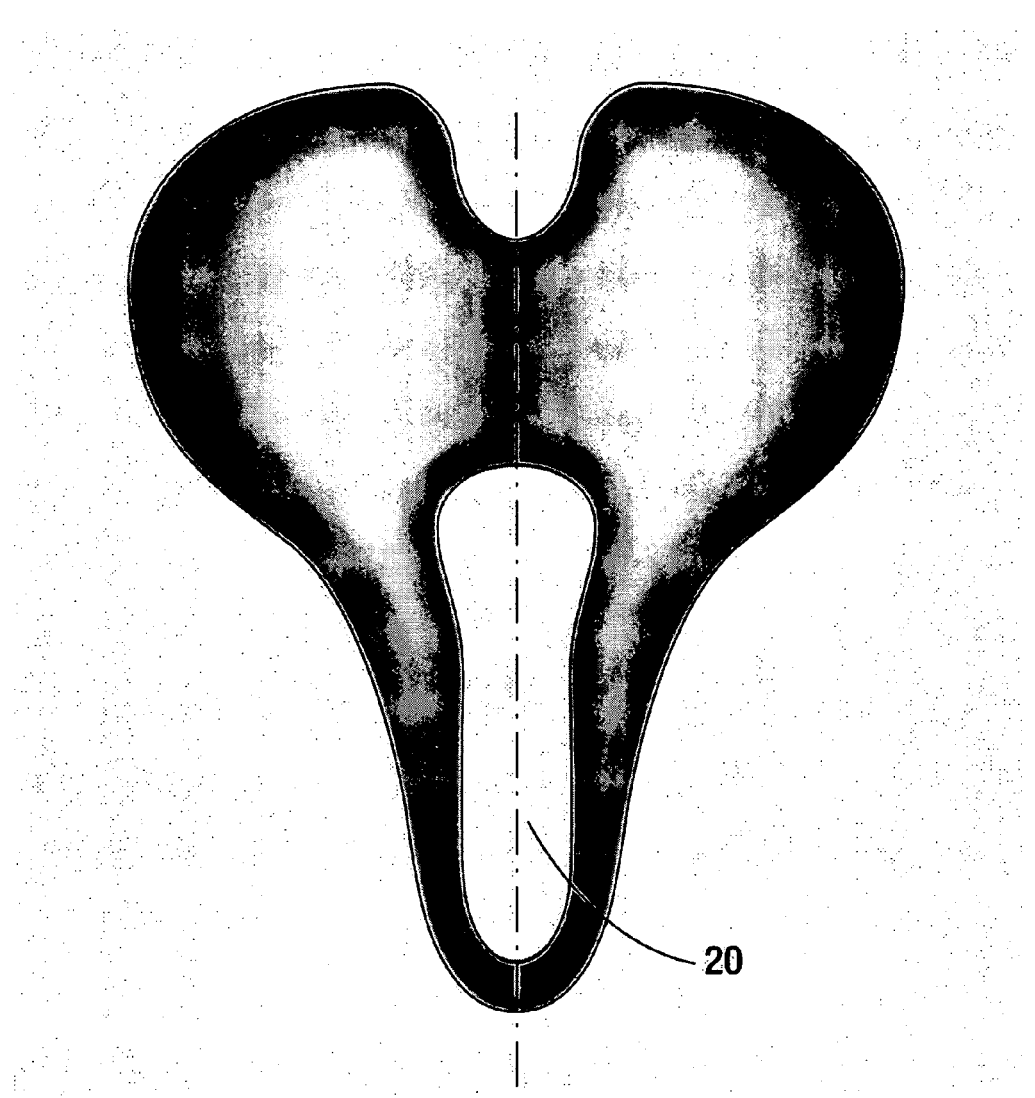
FIG. 12 is a plan view of a touring bicycle saddle according to the invention.

FIG. 11 shows the rear view of the saddle according to the invention with the dissection of the gluteus muscles, the coccyx, and the sacrum, positioned on the surface of the saddle according to the invention; it can be seen that the coccyx is at a reasonable distance from the surface of the saddle due to the presence of the hollow 21 (FIG. 1) and that the gluteus muscles find an ergonomic support on the side surfaces of the saddle that slope downwards at an approximate angle of 45°-60°. The bridge plate 23 (FIG. 5) that connects the two fixing plates 22, 22', of the rail, will be used to display the manufacturer's trademark for marketing the saddle according to the invention.
  a) coccyx
  b) gluteus muscles FIG. 12 shows the plan view of the touring saddle which has a non-limiting length of 20-22 cm, and with a non-limiting width of approximately 18-20 cm at the rear part, as well as the central channel (20) (FIG. 1) which has a width of approximately 4-5 cm at the rear part and a width of approximately 2.5-3 cm at the front part.

Figure 13:
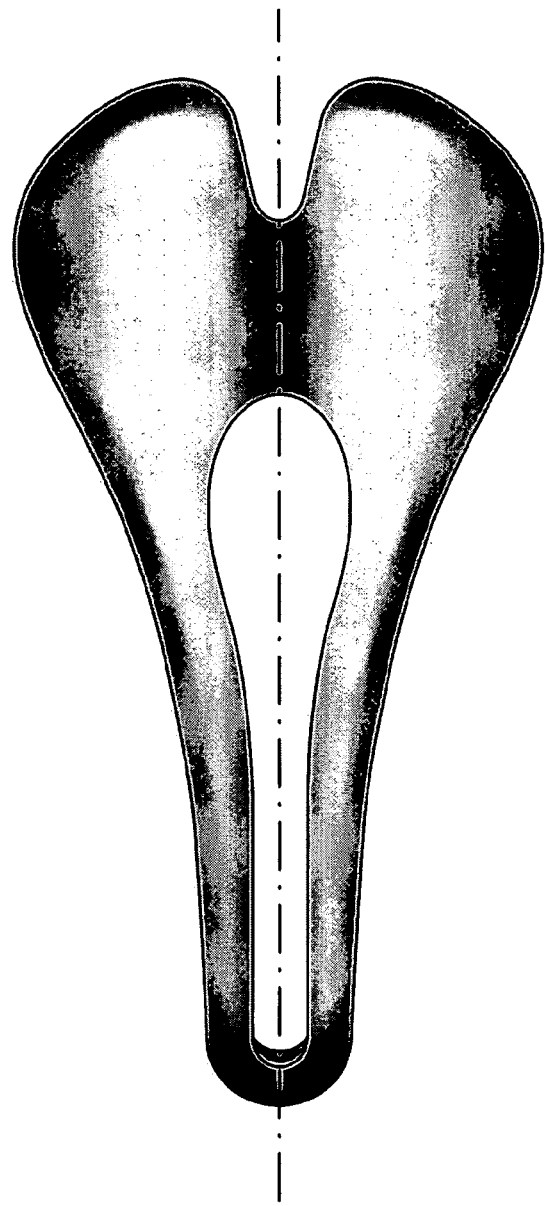
FIG. 13 is a plan view of a saddle for amateur cyclists and a racing bicycle saddle according to the invention.

FIG. 13 shows a plan view of the saddle according to the finding for amateur cyclists, which has a non-limiting width of approximately 14 cm at the rear part, terminating at the front parts with a non-limiting width of 3.5-4.5; the centre line channel 20 (FIG. 1) has a width of approximately 3.5 cm at the rear part and a width of approximately 2.5 cm at the front part, and a non limiting length of 27 cm, while the non-limiting length for the women's model is 25 cm.

Figure 14:
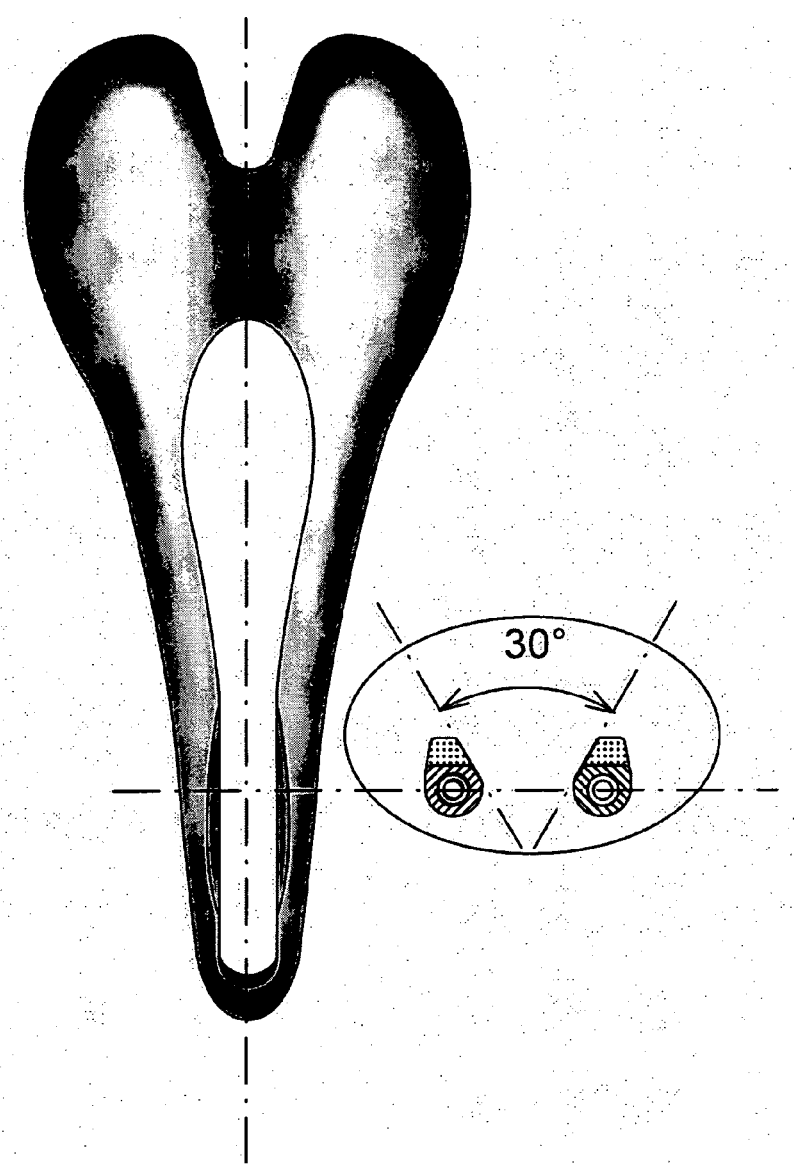
FIG. 14 is a plan view of a competition racing bicycle saddle according to the invention, and particularly of a further widening of the longitudinal central channel in the front part.

FIG. 14 shows the plan view of the competition racing saddle according to the invention which has a non-limiting width of 13 cm at the rear part, and a non-limiting length of 27 cm; the figure also shows the section of the construction detail in the position of points 8 and 8' (FIG. 1), wherein, in this position the internal side surfaces open from a lower position in an upward direction at an angle of 30° so that in this position the central channel 20, (FIG. 1), widens in the upper part as far as approximately 3 cm.

This aspect is important for professional athletes, who during training and races, almost always keep their trunk in a downward facing position, and this shape of the points 8, 8', FIG. 1, permits the body of the penis to be housed in a satisfactory ergonomic space, preventing any compression of the deep dorsal vein and artery of the penis.

Figure 15:
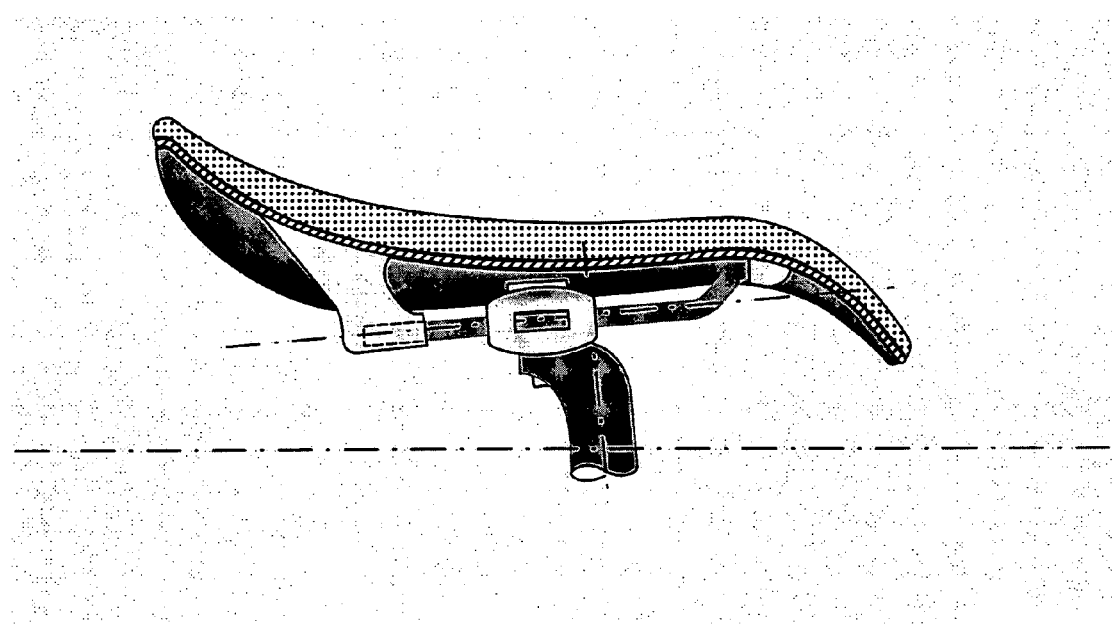
FIG. 15 is a longitudinal section of the shell produced in carbon, and the support rail of the saddle according to the invention.
Figure 16:
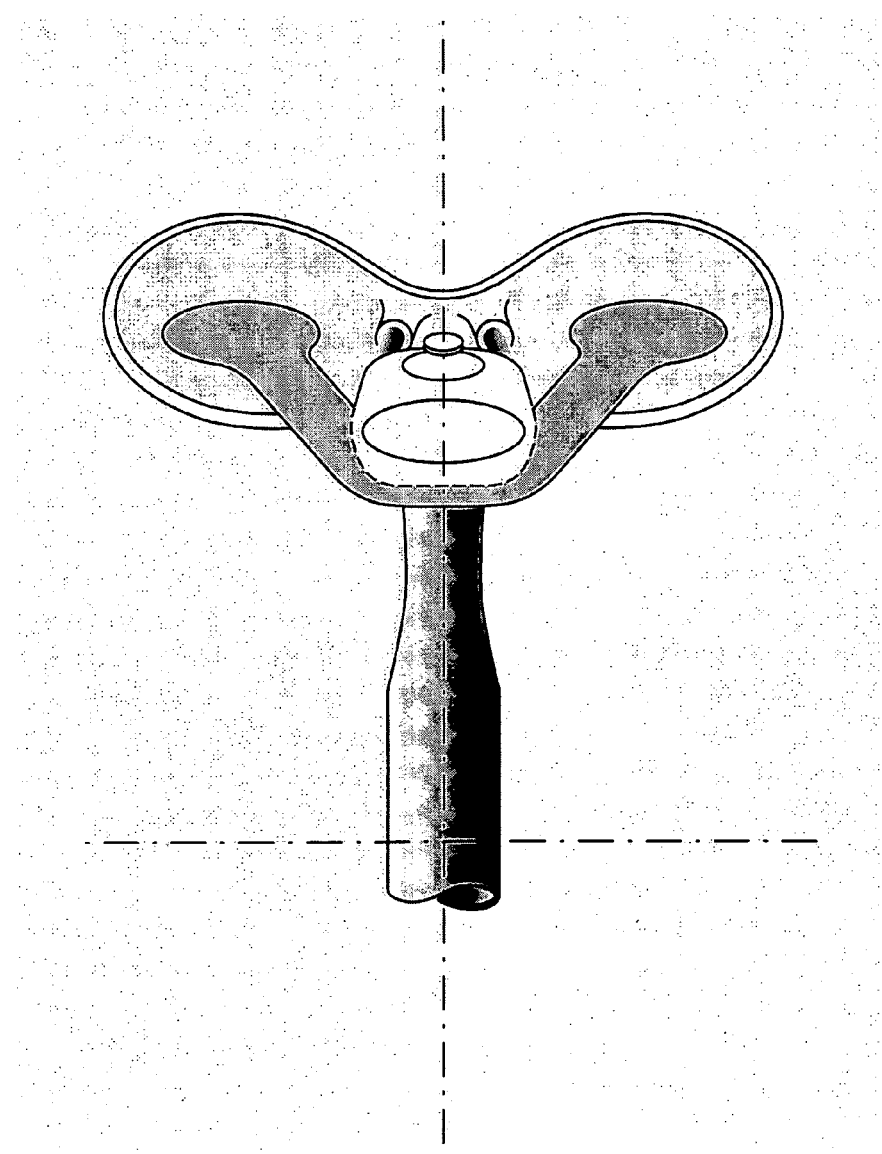
FIG. 16 is a rear view of the shell of the saddle according to the invention produced in carbon.

To satisfy the considerable request for bicycle saddles which should be as light as possible in weight, FIG. 15 shows a longitudinal section of the shell made of carbon material only. In order to lighten the weight even further, the rear part that projects in an upward direction has been removed from the support rail 13 (FIG. 5), which is provided with the saddle of this invention, and has been replaced with two elements that form an integral part of the shell in question (see FIG. 15A) which move in a downward direction until they are in contact with the rear part of the rail, which has a closed form at this point, and then they are fixed in the underlying part by a suitable plate held by two extra-light metal self-threading screws.

The invention claimed is:

1. A bicycle saddle suitable for racing having two longitudinally symmetrical identical portions (1,1') and a length of about 27 cm, comprising:
  a) two adjacent rear parts (2, 2') having a total width of about 13 to 14 cm and joined by a hollow shaped section (21) about 4 to 6 cm in length and about 1.5 cm deep, said hollow shaped section (21) being adapted to prevent a cyclist's coccyx from touching said bicycle saddle's surface, each rear part (2, 2') including a rear portion sloping upwardly at an angle of about 10° to 20° so as to be adapted to support the cyclist's gluteus muscles, a part (2", 2'") proximate to said hollow shaped section (21) being substantially flat and having a total width of about 7 cm, a side part (2"", 2""') extending downwardly from each said flat part (2", 2'"), respectively, at an angle of about 45° to 60° so as to be adapted to prevent friction against the cyclist's gracilis and adducent muscles during pedaling, said adjacent rear parts (2, 2') having a recessed rear intermediate zone (3) substantially dove-tailed in shape commencing at an end of said hollow shaped section (21) and terminating at said rear parts (2, 2') at ends (5', 5"), respectively, about 2.5 to 3 cm apart;

b) two front portions (7", 7'") joined respectively to the flat parts (2", 2'") of said adjacent rear parts (2, 2') sloping upwardly from the juncture of said front portions (7", 7'") with said flat parts (2", 2'") at an angle of about 5°, the bicycle saddle having a width at the juncture of said front portions (7", 7'") with said flat parts (2", 2'") of about 6 to 8 cm narrowing towards a front end of said bicycle saddle to about 4 to 4.5 cm, said front portions (7", 7'") having sides extending substantially perpendicularly downward, the cyclist's isciatic tuberosities and ischial pubic rami being supportable on said flat parts (2", 2'") and front portions (7", 7'"), respectively;

c) two front end sections (9,9') continuing from said front portions (7", 7'"), respectively, said front end sections (9, 9') slope downwardly in a substantially hook shaped curve at an angle of about 30° to 45° and unite at the front end of said bicycle saddle in a substantially semi-circular shape having a diameter of about 3.5 to 4 cm, the downward sloping of said front end sections (9, 9') being adapted to prevent compression of the cyclist's genitals and compression of the deep dorsal artery and vein so as to maintain normal blood flow; and d) a central channel (20) commencing at a front terminus of said hollow shaped section (21) with a semi-circular shape having a diameter of about 3 cm which narrows to a width of about 2.5 cm and terminates at the front end of said bicycle saddle with a semi-circular shape, said central channel (20) separates unjoined portions of said rear parts (2, 2'), said front portions (7", 7'") and said front end sections (9, 9'), the cyclist's perineum being disposable above said central channel (20) so that the structures thereof are not compressed, whereby the cyclist is supportable on said bicycle saddle exclusively on the gluteus muscles, the isciatic tuberosity, and the pubic ischium.

2. The bicycle saddle as defined in claim 1, which further comprises a soft upper padding attached to and overlying said bicycle saddle wherein on the rear parts (2, 2') the thickness of said padding is about 2 to 10 mm, said thickness increasing to about 10 to 15 mm on said front portions (7", 7'") and then decreasing to about 3 mm on said front end sections (9, 9').

3. The bicycle saddle as defined in claim 2, wherein the padding is formed of a material taken from the group consisting of soft compact polyurethane, foam polyurethane, two component polyurethane elastomer foam, styrol-butylene-styrol, and vulcanized rubber foam.

4. The bicycle saddle as defined in claim 1, wherein a padding is fixed on said bicycle saddle, said bicycle saddle being composed of a material taken from the group consisting of plastic, nylon plastic plus carbon, and carbon; and on an underlying surface of said bicycle saddle at said rear parts (2, 2') two protruding elements (16) having a prismatic form and having central seats shaped to accept a support rail (13) are provided, two small plates (22, 22') are provided to secure the support rail to said protruding elements (16), respectively, by self-threading screws; and along an external perimeter of said bicycle saddle a ridge (18) is provided having a width of about 6 mm and a thickness of about 3.5 mm to which a leather covering of the bicycle saddle is secured.

5. The bicycle saddle as defined in claim 1, wherein said channel (20) at said front portions (7", 7'") and said front end sections (9, 9') opens from below in an upward direction at an angle of about 30° thereby increasing the width of said channel (20) to about 3 cm so that a larger ergonomic space is provided.

6. A bicycle saddle suitable for touring having two longitudinally symmetrical identical portions (1,1') and a length of about 20 cm, comprising:

a) two adjacent rear parts (2, 2') having a total width of about 18 to 22 cm and joined by a hollow shaped section (21) about 4 to 6 cm in length and about 1.5 cm deep, said hollow shaped section (21) being adapted to prevent a cyclist's coccyx from touching said bicycle saddle's surface, each rear part (2, 2') including a rear portion sloping upwardly at an angle of about 10° to 20° so as to be adapted to support the cyclist's gluteus muscles, a part (2", 2'") proximate to said hollow shaped section (21) being substantially flat and having a total width of about 7 cm, a side part (2"", 2""') extending downwardly from each said flat part (2", 2'"), respectively, at an angle of about 45° to 60° so as to be adapted to prevent friction against the cyclist's gracilis and adducent muscles during pedaling, said adjacent rear parts (2, 2') having a recessed rear intermediate zone (3) substantially dove-tailed in shape commencing at an end of said hollow shaped section (21) and terminating at said rear parts (2, 2') at ends (5', 5"), respectively, about 2.5 to 3 cm apart;

b) two front portions (7", 7'") joined respectively to the flat parts (2", 2'") of said adjacent rear parts (2, 2') sloping upwardly from the juncture of said front portions (7", 7'") with said flat parts (2", 2'") at an angle of about 10° to 20°, the bicycle saddle having a width at the juncture of said front portions (7", 7'") with said flat parts (2", 2'") of about 6 to 8 cm narrowing towards a front end of said bicycle saddle to about 4 to 4.5 cm, said front portions (7", 7'") having sides extending substantially perpendicularly downward, the cyclist's isciatic tuberosities and ischial pubic rami being supportable on said flat parts (2", 2'") and front portions (7", 7'"), respectively;

c) two front end sections (9,9') continuing from said front portions (7", 7'"), respectively, said front end sections (9, 9') slope downwardly in a substantially hook shaped curve at an angle of about 75° and unite at the front end of said bicycle saddle in a substantially semi-circular shape having a diameter of about 3.5 to 4 cm, the downward sloping of said front end sections (9, 9') being adapted to prevent compression of the cyclist's genitals and compression of the deep dorsal artery and vein so as to maintain normal blood flow; and d) a central channel (20) commencing at a front terminus of said hollow shaped section (21) with a semi-circular shape having a diameter of about 4 to 5 cm which narrows to a width of about 2.5 to 3 cm and terminates at the front end of said bicycle saddle with a semi-circular shape, said central channel (20) separates unjoined portions of said rear parts (2, 2'), said front portions (7", 7''') and said front end sections (9, 9'), the cyclist's perineum being disposable above said central channel (20) so that the structures thereof are not compressed, whereby the cyclist is supportable on said bicycle saddle exclusively on the gluteus muscles, the isciatic tuberosity, and the pubic ischium.

7. The bicycle saddle as defined in claim 6, which further comprises a soft upper padding attached to and overlying said bicycle saddle wherein on the rear parts (2, 2') the thickness of said padding is about 2 to 10 mm, said thickness increasing to about 10 to 15 mm on said front portions (7", 7''') and then decreasing to about 3 mm on said front end sections (9, 9').

8. The bicycle saddle as defined in claim 7, wherein the padding is formed of a material taken from the group consisting of soft compact polyurethane, foam polyurethane, two component polyurethane elastomer foam, styrol-butylene-styrol, and vulcanized rubber foam.

9. The bicycle saddle as defined in claim 6, wherein a padding is fixed on said bicycle saddle, said bicycle saddle being composed of a material taken from the group consisting of plastic, nylon plastic plus carbon, and carbon; and on an underlying surface of said bicycle saddle at said rear parts (2, 2') two protruding elements (16) having a prismatic form and having central seats shaped to accept a support rail (13) are provided, two small plates (22, 22') are provided to secure the support rail to said protruding elements (16), respectively, by self-threading screws; and along an external perimeter of said bicycle saddle a ridge (18) is provided having a width of about 6 mm and a thickness of about 3.5 mm to which a leather covering of the bicycle saddle is secured.

* * * * *